Patented Oct. 25, 1938

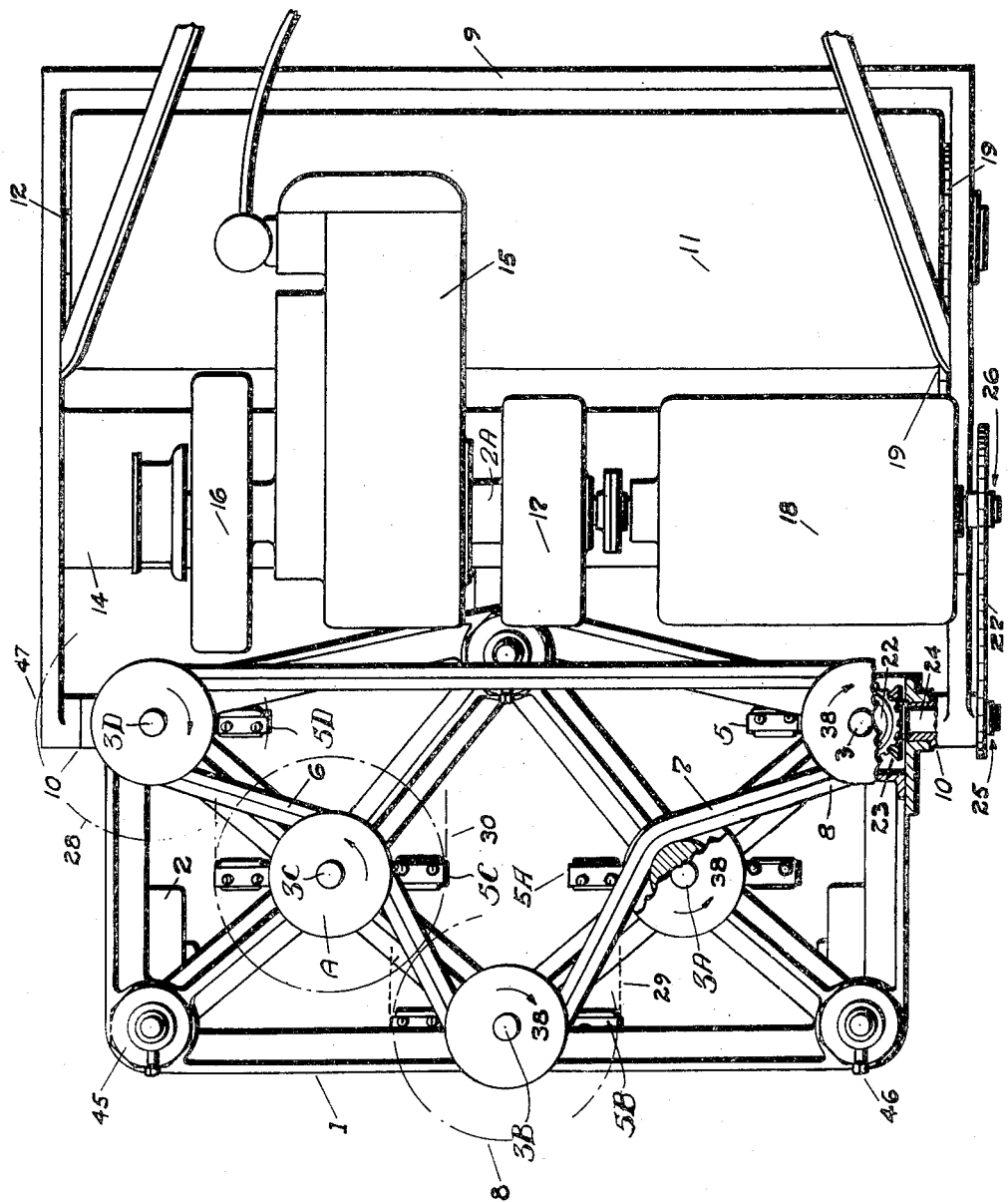

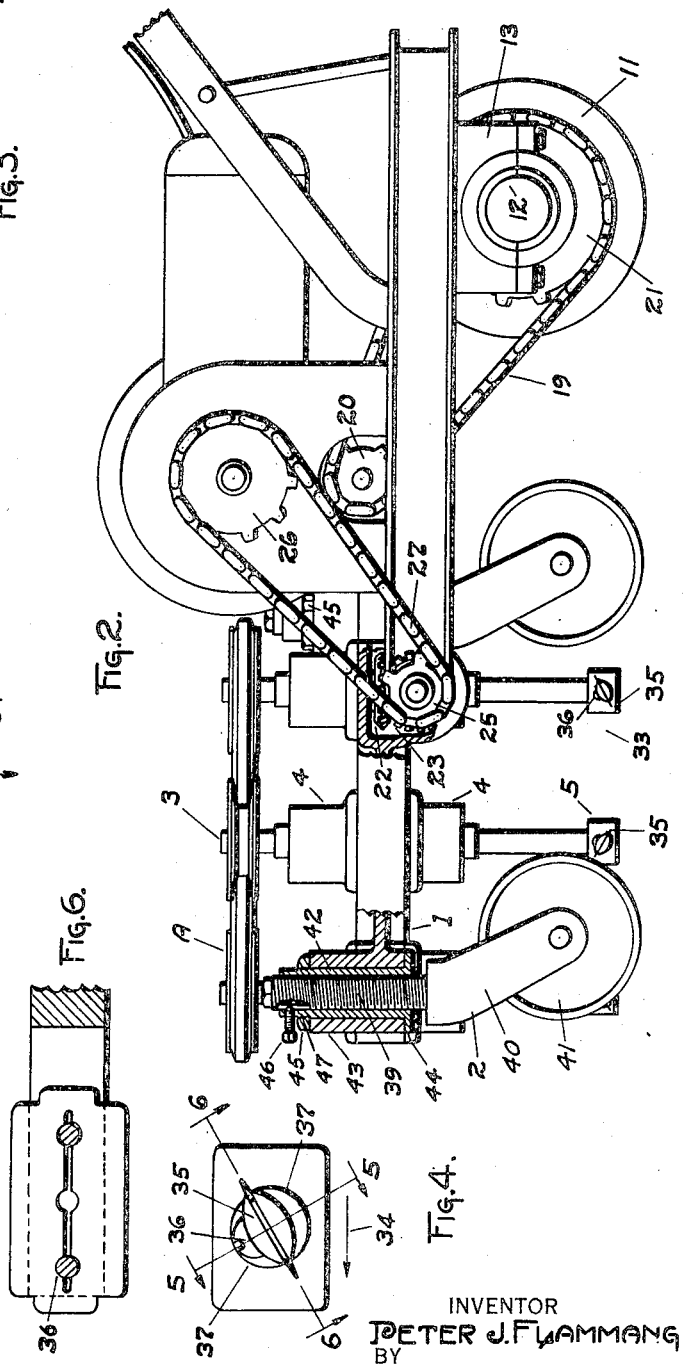
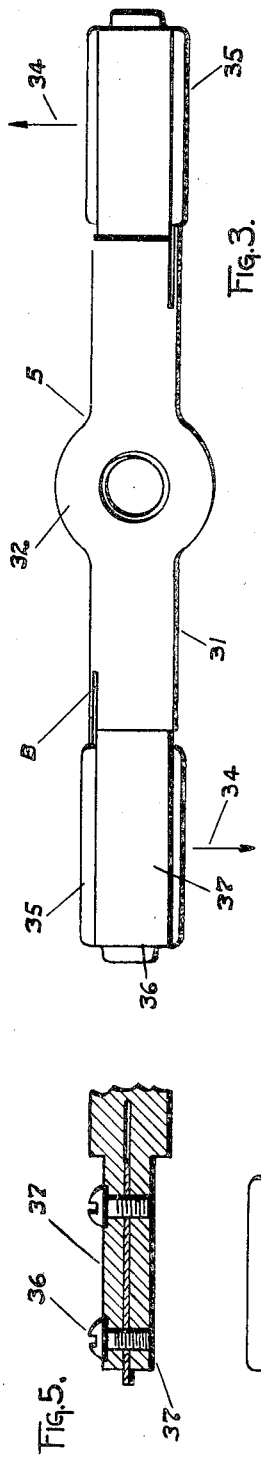
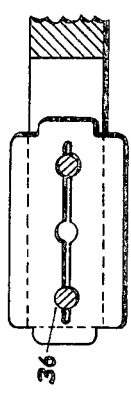

2,134,115

UNITED STATES PATENT OFFICE 2,134,115

MULTIPLE ROTARY MOWER

Peter J. Flammang, Beech Grove, Ind.

Application December 2, 1935, Serial No. 52,455

6 Claims. (Cl. 56—25)

The invention is a mowing machine and more especially a grass and herbage cutting machine for use on lawns or the like; and the invention consists substantially in the construction, combination, and arrangement of elements hereinafter pointed out and recited more particularly in the claims.

It is a primary object of the invention to provide a series of staggered cutter bars, the cutting paths of which overlap to assure the mowing of surface between the cutter bars.

It is also an object to provide a mechanism having a plurality of cooperating rotary cutting means and to drive all of said cutting means through a single belt.

It is an important object to drive a series of rotary mowing cutter bars by pulleys co-axially arranged therewith, respectively, and to drive all of said cutter bars by a single belt threaded in driving contact with all of said pulleys.

It is a further object to provide a mechanism with rotary cutter bars certain of which rotate oppositely to the others, the cutter bars which rotate in one direction being alternately spaced with those which rotate in the other direction, each of said cutter bars having an individual pulley, and the mechanism including a belt which engages all of said pulleys.

It is also an object to provide a mowing machine having a power section and another cutter section having a series of independent rotary cutters said other section maintaining its level with the surface being mowed substantially independent of the power section.

It is also an object to provide a rotary cutter bar having replaceable cutting units, and to construct said cutter bar in a manner to receive and secure ordinary safety razor blades as the cutting units.

It is also an object to provide a mower having a cutting section, and to provide caster supports for such section, and to provide in conjunction with said caster supports, a means to vary the supported height of said section in adjusting the mower to different cutting heights.

The above and other objects are attained by the structure described herein and illustrated in the accompanying drawings in which:

Figure 1 is a plan view of the device, certain parts of which are shown or broken away;

Fig. 2 is a fragmentarily cross sectional side elevation of Fig. 1 taken on the line 3—3;

Fig. 3 is a detailed view of one of the cutters;

Fig. 4 is an end view of Fig. 3;

Fig. 5 is a cross sectional view taken in the proximity of line 5—5, of Fig. 4; and, Fig. 6 is a cross sectional view taken in the proximity of line 6—6, of Fig. 4.

Similar characters of reference designate similar parts throughout the different views.

Referring to Figure 1, the numeral 1 designates the cutter section of the machine which is in the form of an elongated horizontal frame supported by the casters 2 and 2A, one of said casters 2 being swiveled to each forward corner of said section and said casters 2A being swiveled midway of the rearward edge thereof.

A phalanx of vertical cutter shafts 3, arranged in converging rows, are journaled in said section through the respective upper and lower bearings 4, which are mounted on the cutter section 1. The downwardly exposed ends of said shafts are provided with rotary cutters 5 and the upwardly protruding ends thereof are provided with groove pulleys A, all of which pulleys are engaged by the belt 6 said belt being zigzagged from one pulley to the other as also indicated by numerals 7 and 8.

The rearward section 9 of the device consists also of a horizontal frame which has trunnion connections 10 with the cutter section 1, by which it will be understood that the forward end of said power section is supported with said cutter section by the casters 2. The rearward end of said power frame is supported by the traction roller 11 which is journaled by the axle 12, which in turn is confined by bearings 13 of said frame, said roller and axle being parallel to the axial centers of the trunnion connections 10.

The horizontal plate 14 is secured to said frame conveniently between the roller 11, and the cutter section 1, and the driving mechanism of the device is mounted thereon, said driving mechanism consisting in this example of the invention of an explosive engine 15 having a fly wheel 16, a clutch 17 and a change speed transmission 18. The roller 11 is rotated by said engine through said clutch and transmission, and the chain 19 which engages the sprocket 20 of said transmission and also the sprocket 21 of said roller.

One of the cutter shafts 3 is positioned in the cutter section 1 adjacent one of the trunnion connections 10, the axial line of said cutter shaft intersecting the axial line of said trunnion connection. Between the upper and lower bearings 4 of said cutter shaft the driven gear 22 is concentrically secured thereto, and meshes with the driving bevel gear 23 of the shaft 24 which is journaled through the adjacent trunnion connection concentrically therewith and protrudes on the other side of said journal connection, the thus protruded end of said shaft being provided with a sprocket 25 which is driven by the sprocket 26 of the transmission 18 through the chain 27.

From the foregoing it will be understood that the other cutter shafts 3A, 3B, 3C and 3D are rotated by the cutter shaft 3 driven directly through the bevel gears 22 and 23, by the chain 27 which in turn is driven by the engine 15 through the transmission 18. As the cutters 5, 5A, 5B, 5C and 5D, respectively are thus rotated, the traction roller 11 is rotated by said engine through said transmission and chain 14, by which it will be understood that the machine is propelled overland, the cutter section 1 being constantly advanced and said cutters together cutting a swath of grass, herbage, or the like.

Referring to Fig. 1, the rotary paths of the individual cutter bars are indicated by the dot-and-dash lines 28, the cutting path of the more forward cutter being indicated as between the dotted lines 29. The cutting paths of the cutters next to said forward cutter are indicated as between the broken lines 30, from which it will be seen that the retrograde position of said next cutters in respect to said forward cutter is such that the cutting path of same overlap the cutting path of said forward cutter, the respective cutting path of all of said cutters overlapping that of the cutters adjacent thereto, thus assuring that the area between the cutters is mowed and that the cutting swath of the machine as a whole is continuous throughout its width, it being an object to thus provide that all of the cutter bars operate at the same height without interference and without timing the movement of said cutter bars through gearing to avoid interference of same.

The cutters 5 consist each of a cutter bar 31 each of said arms having a hub 32 midway of its ends as shown in Fig. 3, are threaded onto the end of the respective cutter shaft, the middle and end cutter bars and shafts being right hand threaded and the others being left hand threaded so that the driving action of shafts tighten the cutter bars thereon.

The direction of rotation of the cutter shown in Fig. 3 and Fig. 4 is in the direction indicated by the arrows 34, each extremity of each cutter bar 31 having a slot B which extends longitudinally for a distance from the end thereof, the lower edges of each of said slots being on the advance side of the respective extremity, by which feature the blades 35 which are disposed therein are maintained in suitable cutting angular position approximately 45 degrees, the advance edge of each blade extending sufficiently in advance of the respective cutter bar extremity to cut grass, herbage or the like, against which it is rotated, said blades being conveniently retained in the cutter bars by screws 36 which are threaded into said bars through said blades and serve to keep the slot forming parts of said bars sprung into gripping contact with said blades.

By referring more especially to Fig. 6 it will be understood that the blades 35 are any commercial type of ordinary safety razor blade although it will be understood that blades of the same general character may be used in lieu of safety razor blades.

It will be observed that the blades 35 are positioned similarly to fan blades by which feature air is driven upwardly thereby causing a suction from under the rotary path of the blades such suction causing leaning grass or herbage to take and remain in a more upright position at the instant of the cutting operation and assures that grass which is tramped or otherwise bent in position will be righted at the moment of cutting same, thus leaving a smooth and evenly mowed surface. To further give the cutter blades and cutter bar together the character of a fan blade, surfaces 37 are formed on the exterior of each cutter bar said surfaces being together stream lined co-directional with the angle of the respective cutter blades, which cooperate therewith in subjecting the grass or other herbage to such suction; and in this respect the blades of one cutter bar pass through the adjacent points in their respective paths, in the same direction and together co-ordinate in the described suction action and tend to cooperate in throwing the cut grass or the like free of the device.

By referring to the arrows 28 of Fig. 1 it will be understood that alternately spaced cutters 5 rotate in one direction while the other cutter bars rotate in the opposite direction due to the engagement of the belt 6 with the opposite side of the next adjacent pulley A, respectively for which reason alternate ones of the cutter bars and blades, are pitched as illustrated in Fig. 3, while the others are pitched oppositely.

Each of the casters 2 consists of a shank 39 upon the lower end of which the rearwardly and downwardly extending pair of forks 40 are formed, a caster wheel 41 being journaled in each pair of forks. Each of the shanks 39 is threaded through a bushing 42 which fits rotatably in a corresponding boss 43 formed on the cutter section 1, the lower end of each bushing being provided with a head 44, and the respective boss 43 being between such head and a nut 45 threaded over the upper end of each of said bushings.

The height of the cutter section 1 is varied, as supported by the casters 2, by threading the bushings 42 along on the shanks 39 a more or less amount which correspondingly varies the height of the cutters 5 by which feature the machine is readily adjusted to mow grass, weeds or the like as close to the ground as desired, said bushings being locked against casual rotation on said shanks by screws 46 which are each threaded through the wall structure of said bushing above the respective nut 45, and into vertical splines 47 formed longitudinally in said shanks.

By referring to Fig. 1 it will be observed that the cutting path of cutter 5 most remote from the gear driven shaft 3, extends beyond the frame 9 and beyond the respective side structure of the machine at point 48 by reason of which the device may be used to mow grass and the like up to directly along a building, fence or curb without interference of any part of the device with same, and therefore without leaving unmowed herbage adjacent such building, fence, curb or the like.

In this example of the invention the cutters 5 are arranged in phalanx or V formation the two rows of cutters converging forwardly although it will be understood that the machine is also constructed in reverse phalanx formation, and by co-joining rows of two cutters as is conveniently carried into effect by constructing machine with only the three forward cutters shown in this example of the invention. It will be obvious that all the cutters may be arranged in a single row, such row being angular to the general direction of travel of the machine so that while the description and drawings illustrate in a general way certain elements and arrangements thereof, which may be employed in carrying the invention into effect, it is obvious that many modifications may be made in the various details without departing from the scope of the appended claims, it being understood that the invention is not restricted to the particular examples shown and described.

The invention claimed is:

1. A mowing machine comprising a motor frame, a cutter frame pivoted to the motor frame, a series of vertical shafts mounted on the cutter frame, a disk cutter on the lower end of each shaft and overlapping the adjoining cutter in a line of travel of the machine, a motor carried by the motor frame, means operated by the motor for driving one of said cutter shafts, a pulley carried by the upper end of each cutter shaft and a single belt so engaging each of said pulleys to drive each adjoining cutter in opposite direction.

2. A mowing machine comprising a motor frame, a cutter frame pivoted to the motor frame, a series of vertical shafts mounted on the cutter frame, a disk cutter on the lower end of each shaft and overlapping the adjoining cutter in a line of travel of the machine, a motor carried by the motor frame, means operated by the motor for driving one of said cutter shafts, means operated by the motor for driving said frame, a pulley carried by the upper end of each cutter shaft and a single belt so engaging each of said pulleys to drive each adjoining cutter in opposite direction.

3. A mowing machine comprising a motor frame, a motor carried thereby, a cutter frame mounted on horizontal shafts carried by the motor frame, a series of horizontal cutter disks carried by the frame, means operated by the motor for rotating one of said shafts connecting the motor and cutter frame, and means operated by the driven shaft for rotating said cutter disks.

4. A mowing machine comprising a motor frame, a motor carried thereby, a cutter frame mounted on horizontal shafts carried by the motor frame, a series of horizontal cutter disks arranged in two converging rows overlapping the adjoining cutters in a line from front to rear, means operated by the motor for driving one of said shafts, means operated by said driven shaft for driving one of said cutters and means operated by said driven cutter for driving the remaining cutters.

5. A mowing machine comprising a motor frame, a motor mounted thereon, means operated by the motor for driving said frame, horizontal shafts carried by the motor frame, a cutter frame mounted on said shafts and oscillating thereon, a series of vertical shafts mounted in the cutter frame, cutter disks carried by the lower end of the vertical shafts, means operated by the motor for driving one of the horizontal shafts between the motor and cutter frame, means operated by said driven horizontal shaft for operating one of the vertical shafts and means operated by said driven vertical shaft for operating each succeeding cutter shaft in opposite direction.

6. A mowing machine comprising a motor frame, a motor mounted thereon, means operated by said motor for driving said frame, two short horizontal shafts rotatably mounted on the motor frame, a gear carried by one of said horizontal shafts, a cutter frame swingingly mounted on said rotatably mounted shafts, a series of vertical shafts mounted in the cutter frame, a gear carried by one of said vertical shafts, cutters carried by the lower ends of said shafts, means operated by the motor for rotating one of said horizontal shafts, the gear carried by said horizontal shaft meshing with the gear carried by one of said horizontal shafts, and a belt driven by said cutter shaft for rotating each succeeding cutter shaft in opposite directions.

PETER J. FLAMMANG.